April 28, 1953      S. M. KASS      2,636,756
SECURING DEVICE FOR FAUCET HANDLES
Filed Oct. 4, 1948
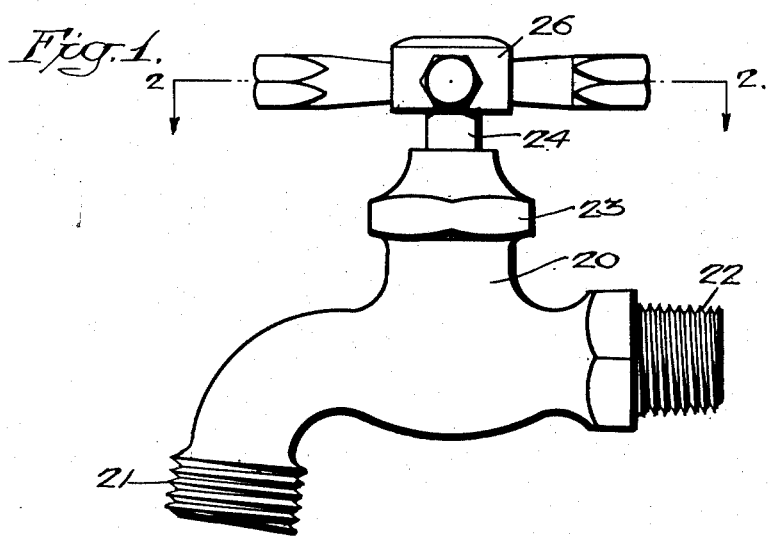
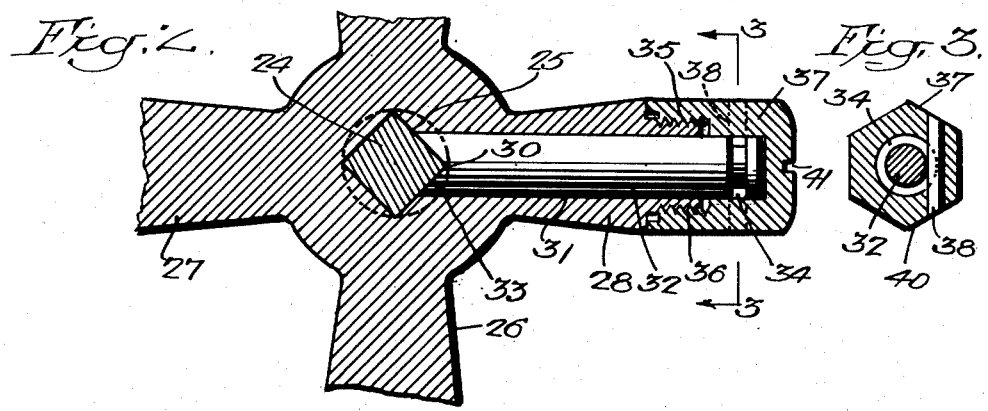
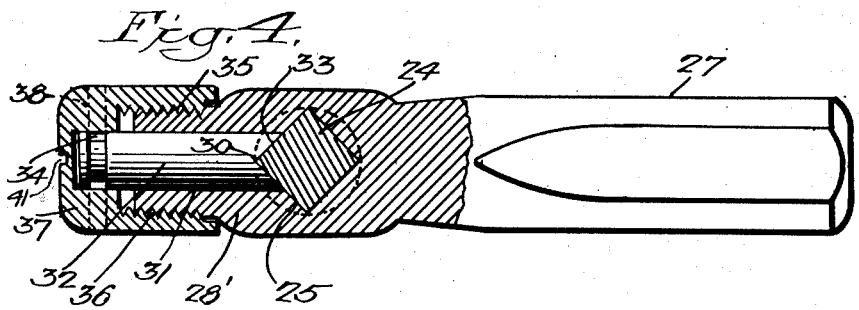
INVENTOR
Samuel M. Kass.
BY
ATTORNEYS Patented Apr. 28, 1953

2,636,756

UNITED STATES PATENT OFFICE 2,636,756

SECURING DEVICE FOR FAUCET HANDLES

Samuel M. Kass, Philadelphia, Pa.

Application October 4, 1948, Serial No. 52,698

1 Claim. (Cl. 287—53)

The present invention relates to handles for faucets, primarily of the type used for distribution of drinking water.

A purpose of the invention is to permit securely locking a faucet handle to the stem of a faucet without marring the stem and thus without interfering with the ability to remove the handle.

A further purpose is to permit engagement between the stem of a faucet and the handle at a corner of the stem.

A further purpose is to provide a locking pin extending through an arm of the handle, and desirably secured by a nut surrounding the locking pin at the outer end of the arm.

A further purpose is to provide a rotationally free connection between the locking pin and the nut, preferably by a slot and retainer.

A further purpose is to permit removal and tightening of the handle by a standard screw driver having a large slot.

Further purposes appear in the specification and in the claim.

In the drawings I have chosen to illustrate a few only of the numerous embodiments in which my invention may appear, choosing the forms shown from the standpoints of convenience in illustration, satisfactory operation and clear demonstration of the principles involved.

Figure 1 is a side elevation of a faucet to which the invention has been applied.

Figure 2 is an enlarged fragmentary section of Figure 1 on the line 2—2.

Figure 3 is a section of Figure 2 on the line 3—3.

Figure 4 is a view partly in section corresponding generally to Figure 2, but showing a variation.

In the drawings like numerals refer to like parts throughout.

Described in illustration but not in limitation reference is made to the drawings.

In the prior art it has been common practice to secure the handle to the stem of a faucet in one of several ways. In some cases the stem and the socket of the handle are fluted in cross section and the handle makes a drive fit with the stem. This has proved objectionable because of the marring of the parts in driving, and the inability to remove and reapply the handle from time to time as necessary. In other cases a set screw is employed, accessible at the outside of the socket portion of the handle. This is subject to the usual disadvantages of set screws. A small screw driver is required, and a small screw slot is available, so that the user is very likely to mar the screw slot and be unable to remove the set screw. The interior end of the set screw is forced into the stem, and often considerable tightness of engagement is required to prevent displacement. The marring of the stem incident to such engagement often makes it difficult to remove the handle over the marred area after the set screw is loosened. The set screw form appears in variations in which the set screw constitutes or extends through an arm of the handle or set screws are applied through several arms of the handle, but these forms are open to the same disadvantage regarding drilling into and marring the stem.

The present invention is designed to hold the handle firmly on the stem without marring the stem, thus permitting very ready removal of the handle when the stem is released. Rotation of the locking pin with respect to the stem is prevented and therefore the objectionable feature of the set screw devices of boring into the stem is avoided. The entire operation can be performed with a normal large screw driver, or even with pliers or a small wrench.

Figure 1 illustrates a faucet 20 having a discharge nozzle 21, a connection 22 to the water piping, a removable cap 23 and an operating stem 24. The stem is of parallelogram, preferably square or other cornered cross section as shown in Figure 2, near the upper end, and engages a similarly shaped socket 25 in a handle 26. In the form of Figures 1 to 3 inclusive, the handle has three lever arms 27 which do not contribute to the locking, and a locking arm 28. In the form of Figure 4, there is one lever arm 27 of normal type and a slightly shorter opposite locking arm 28'.

The locking arms 28 and 28' are in line with a corner 30 of the socket parallelogram or other cross sectional shape, and a radial opening 31 extends longitudinally of the locking arm, with its axis in line with the corner 30.

A locking pin 32 extends longitudinally through the opening 31 of the locking arm. The interior end of the locking pin is forked at 33 to conform in cross section with the cross section of the socket, so that when pressure is applied inwardly on the locking pin it will engage both sides of the stem near the corner.

Near the outer end of the locking pin, an inwardly extending annular recess 34 is provided.

The outer end of the locking arm is externally threaded at 35 and engages internal threads 36 on a nut 37, suitably of cap type, which surrounds the outer end of the locking pin. A retainer 38, suitably in the form of a pin, extends across the nut as shown, through suitable holes, and extends tangentially across the annular recess 34. Thus the nut is free to rotate with respect to the locking pin, but as the nut moves in or out, the locking pin correspondingly moves in or out. The nut 37 is desirably provided with wrench faces 40 and with a screw driver slot 41.

In operation it will be seen that the nut is first backed off until the locking pin is free from interference with the socket. The socket is then applied to the end of the stem, after which the nut is tightened, first with the fingers and then with a screw driver or wrench. Until the forked end of the locking pin engages the stem, the locking pin can rotate freely with the nut, but as soon as one or the other of the forked ends of the locking pin engages the stem, the locking pin is restrained against rotation and must advance further longitudinally without rotation. Thus after the locking pin reaches finger tightness against the stem, further tightening of the nut will cause clamping over broad surfaces at both sides of the corner without tendency to dig into the stem, since the locking pin is not rotating with respect to the stem. Accordingly, when it is subsequently desired to remove the handle, the nut can simply be backed off, carrying with it the locking pin. As there is no appreciable distortion of the stem, it is only necessary to back off the nut a very short distance in order to remove the handle. In the prior art with set screws, the penetration of the point of the set screw was often so great that considerable backing off of the set screw was necessary to permit removal of the handle, and set screws were often lost by backing off too far.

Unlike the practice with set screws, it is no longer necessary to employ a very small screw driver, as the nut can be manipulated by a full-size screw driver or by a wrench, thus saving time by the user.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a faucet handle, a hub having a socket opening of rectangular cross section having corners, an arm extending radially from the hub with respect to the socket opening at a position corresponding with one of the corners and having a radial opening through the arm from the socket opening in line with the corner to the outer end of the arm, external threads on the outer end of the arm, a locking pin extending through the radial opening and having a forked end adjoining the socket and adapted to engage a faucet stem on two sides of the corner, the locking pin having an annular recess at the end remote from the socket, a cap nut having internal threads engaging the external threads on the arm and surrounding the outer end of the pin and a retainer pin extending across the nut into the recess in the locking pin to interconnect the nut and the pin while permitting relative rotation.

SAMUEL M. KASS.

References Cited in the file of this patent

UNITED STATES PATENTS

| Number | Name | Date |
|---|---|---|
| 524,848 | Doebler | Aug. 21, 1894 |
| 597,329 | Rylander | Jan. 11, 1898 |
| 1,209,393 | Campbell | Dec. 19, 1916 |
| 1,315,020 | Hilger | Sept. 2, 1919 |
| 1,782,196 | Dalton | Nov. 18, 1930 |
| 2,013,578 | Pardieck | Sept. 3, 1935 |
| 2,059,759 | Stearns | Nov. 3, 1936 |
| 2,377,541 | Crampton | June 5, 1945 |